US010332359B2

(12) United States Patent
Lopez

(10) Patent No.: US 10,332,359 B2
(45) Date of Patent: Jun. 25, 2019

(54) SYSTEM FOR TRIGGERING BANK AND EQUIPMENT BILL DESTRUCTION DEVICES AND METHODOLOGY FOR TRIGGERING BANK EQUIPMENT BILL DESTRUCTION DEVICES

(71) Applicant: TECNOLOGIA BANCARIA S.A., Sao Paulo, SP (BR)

(72) Inventor: Edson Igor Cifuentes Lopez, Sao Paulo (BR)

(73) Assignee: TECNOLOGIA BANCARIA S.A., Sao Paulo (BR)

( * ) Notice: Subject to any disclaimer, the term of this patent is extended or adjusted under 35 U.S.C. 154(b) by 0 days.

(21) Appl. No.: 15/783,434

(22) Filed: Oct. 13, 2017

(65) Prior Publication Data

US 2018/0108222 A1 Apr. 19, 2018

(30) Foreign Application Priority Data

Oct. 14, 2016 (BR) .......................... 10 2016 023994

(51) Int. Cl.

*G06Q 40/00* (2012.01)
*G07F 19/00* (2006.01)
*G07D 11/12* (2019.01)
*G07D 11/225* (2019.01)
*F23N 5/26* (2006.01)
*F23Q 9/04* (2006.01)

(52) U.S. Cl.

CPC ........... *G07F 19/205* (2013.01); *F23N 5/265* (2013.01); *F23Q 9/045* (2013.01); *G07D 11/12* (2019.01); *G07D 11/225* (2019.01); *F23G 2209/22* (2013.01)

(58) Field of Classification Search

CPC .... G07F 19/20; G07F 19/201; G06Q 20/1085
USPC .......................................................... 235/379
See application file for complete search history.

(56) References Cited

U.S. PATENT DOCUMENTS 8,695,879 B1 * 4/2014 Whytock ............ G07F 19/2055 235/382
2012/0038772 A1 * 2/2012 Priesterjahn ............ G07F 19/20 348/150
2013/0144731 A1 * 6/2013 Baldwin ................ G06Q 20/20 705/17
2018/0082548 A1 * 3/2018 Hodges ............... G07F 19/2055

* cited by examiner

*Primary Examiner* — Ahshik Kim
(74) *Attorney, Agent, or Firm* — Ladas & Parry LLP

(57) ABSTRACT

A system for triggering bank equipment bill destruction devices and methodology for triggering bank equipment bill destruction devices. The system increases security of Automated Teller Machine (ATM) and cash dispenser bank equipment by innovating a trigger rail which is a separate unit directly mounted to the cassette assembly of the bank equipment and is fixed through ignition nozzles which are attached and inserted in openings provided on a structure of the cassettes. The methodology comprises using pyrotechnic means to trigger the bill destruction devices placed inside the cassettes of a bank equipment unit.

5 Claims, 2 Drawing Sheets

SYSTEM FOR TRIGGERING BANK AND EQUIPMENT BILL DESTRUCTION DEVICES AND METHODOLOGY FOR TRIGGERING BANK EQUIPMENT BILL DESTRUCTION DEVICES

SCOPE OF APPLICATION

This invention patent application provides a system for triggering bank equipment intra-cassette bill destruction devices, thus integrating the field of security devices and systems used in bank equipment. This invention patent application also provides a novel methodology for triggering bill destruction devices, to be used in bank equipment.

INTRODUCTION

This invention patent application provides an innovative system that triggers intra-cassette incineration devices to be used in ATM equipment (Automatic Teller Machines), and also in cash dispenser equipment. This invention patent application also provides an innovative methodology that enables triggering of bill destruction devices stored in bank equipment cassettes.

STATE OF THE ART

As is commonly known, for many years, bank institutions have been offering a range of facilities to their customers, among which are the outdoor self-service machines known as ATMs, where various types of operations may be performed, particularly cash withdrawals.

Nowadays, self-service equipment is constantly raided by robbers, employing methods such as using explosives or a variety of tools such as the cutting disk saws, blowtorches, plasma cutting tools, thermal lances, etc.

One of the most common countermeasures is the use of systems that stain (with ink) or destroy money bills stored in the cassettes arranged inside the aforementioned bank equipment.

PROBLEMS OF THE STATE OF THE ART

Security systems that destroy or stain money bills in case of raids require a series of sensors in order to detect a possible raid. Said system types are increasingly modern and smart, and, not unusually, include more than one sensor type to confirm whether a certain event is a physical attack to the teller machine; this increases the cost of the security device and renders the protection of a large amount of teller machines financially unfeasible.

These devices must be installed inside the vault in order to house its accessories, which include sensors, controllers, cable routing and the trigger itself for bill destruction, thus characterizing time-consuming and expensive procedures, and probably taking months to restore security measures on raided locations.

Said devices require maintenance and calibration of accessories, once again increasing costs, both for purchase and maintenance of this kind of equipment.

OBJECTIVES OF THE INVENTION

In face of the issues verified in the state of the art, one of the objectives of this invention patent application is to provide a triggering system for bill destruction devices that is cost-effective for both installation and maintenance.

Another objective of this invention patent application is to provide a methodology for triggering bank equipment bill destruction devices, based on a pyrotechnic mechanism.

SUMMARIZED DESCRIPTION OF THE INVENTION

The triggering system now proposed arises out of a concept that implements a triggering methodology based on the use of pyrotechnics, which enables quick implementation of the system in order to trigger money bill destruction devices in bank equipment (which also comprises the subject approached by this invention patent application) and subsequent protection of bank equipment in regions under constant threat of raiding; furthermore, it enables optimization of device usage, in other words, installing the device on all sites is not required, since it may be taken to locations with higher chances of being raided.

The solution provided by this invention patent application consists in separating the bill destruction device from the triggering device. Both the bill destruction and the triggering devices include pyrotechnics in their assembly, but when said devices are separated, the final product is found to be more stable.

According to the solution provided by this invention patent application, the cassette with the bill destruction system is transported by the securities depository company and the trigger called "trigger rail", which is the most sensitive part, remains in the teller machine.

The triggering proposed by this invention patent application was designed to be triggered when submitted to explosions, any sparks caused by cutting tools, blowtorches, thermal lances, plasma cutting tools, among others, creating a flame at about 900° C. in temperature and about 2 cm long. The aforementioned trigger rail employs pyrotechnic articles only, in order to detect and trigger the ignition nozzles. The separation between the bill destruction system and the trigger rail, as well as the manner in which the trigger rail is sensitized, are the focus of the methodology presented herein.

DESCRIPTION OF THE FIGURES

The system for triggering bank equipment intra-cassette bill destruction devices provided by this invention patent application shall be described in detail below, with reference to the following drawings, in which.

DETAILED DESCRIPTION OF THE INVENTION

Figure 1:
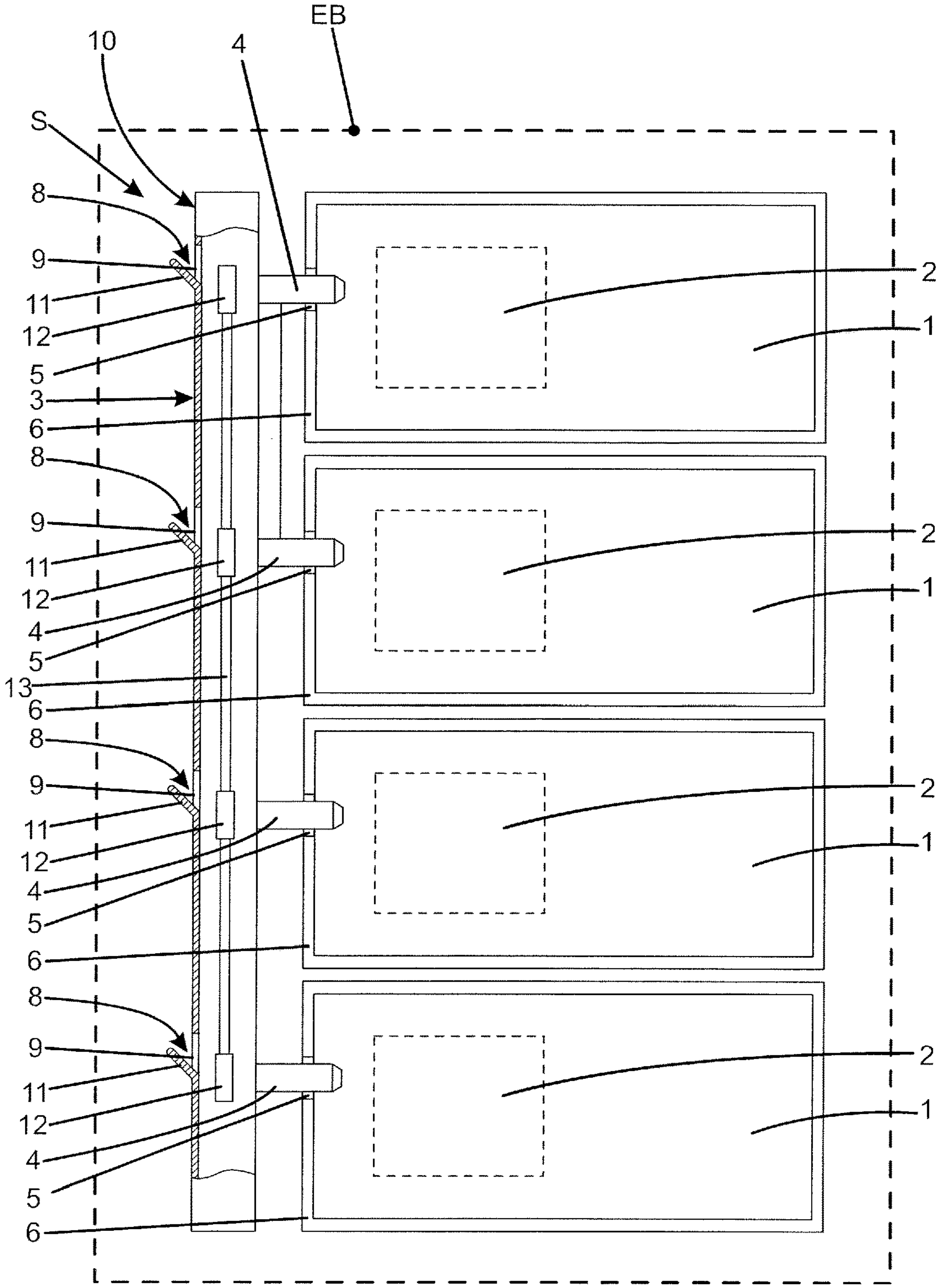
FIG. 1 shows a schematic view of a cassette assembly, such as found in a standard ATM or cash dispenser bank equipment, with the trigger rail positioned in relation to the cassettes and corresponding to the respective bill destruction devices placed therein, which constitutes the core of the triggering system proposed herein.
Figure 2:
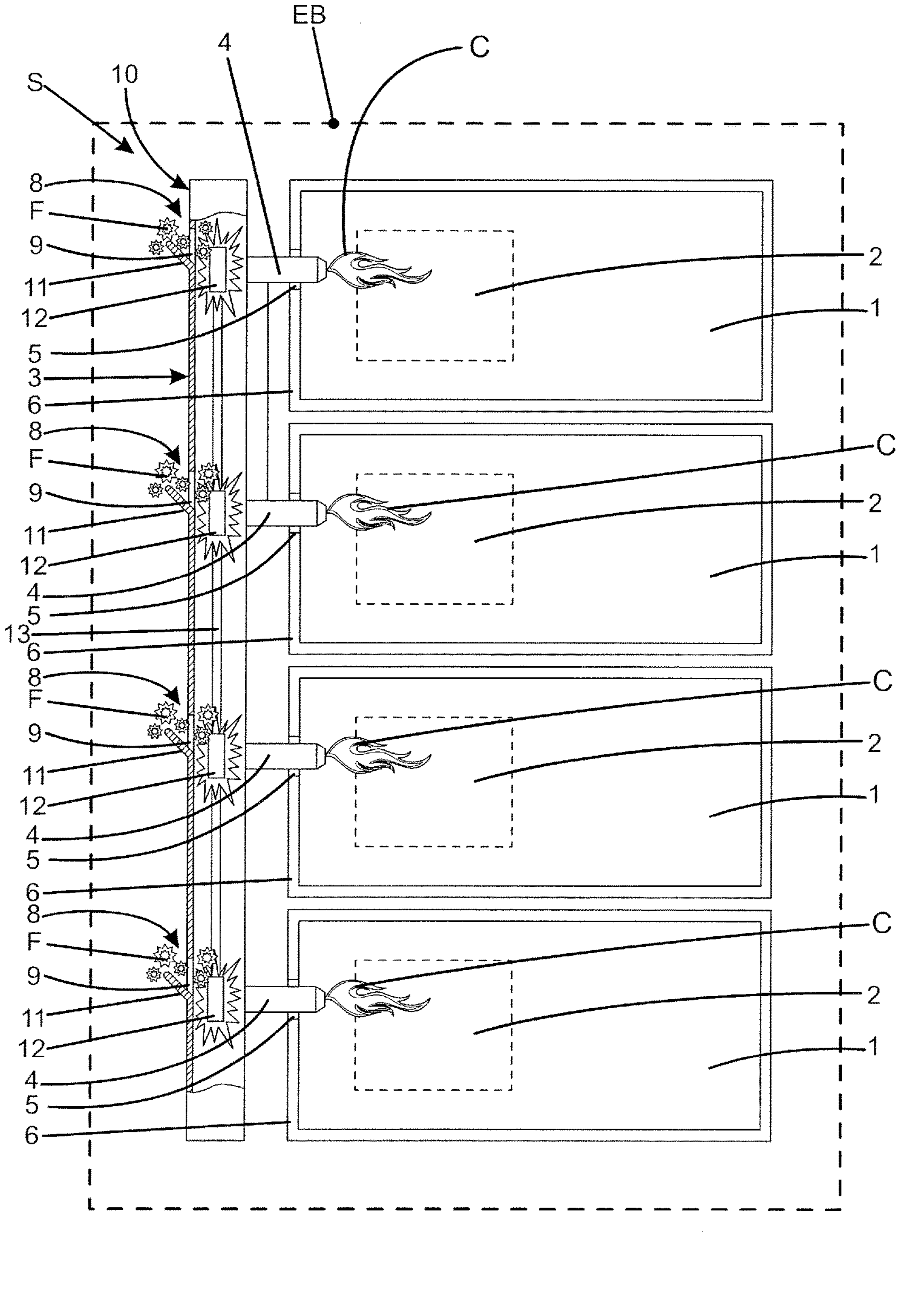
FIG. 2 shows a similar view to what is shown in FIG. 1; however, it shows the triggering of the trigger rail, aiming at the subsequent triggering of the bill destruction devices stored in each of the cassettes, as a response to the exposure of said trigger rail to sparks generated by equipment used for breaking into the bank equipment.

As provided in this Invention Patent application, the cassettes 1 housed inside the bank equipment EB (schematically illustrated by a dashed line) including, individually, the bill incineration device 2, schematically illustrated as dotted rectangular sections inside each of the cassettes 1, receive the triggering system S, with the trigger rail 3 as its main component. The bank equipment EB shown in FIGS. 1 and 2 of the present invention patent application represents, without distinction, ATM and cash dispenser equipment types.

The trigger rail 3 constitutes a separate unit, which is directly mounted to the cassette assembly 1 and, as seen regarding the cassette assembly 1, remains inaccessible inside the bank equipment EB.

The trigger rail 3 is fixed through the ignition nozzles (4) that slot in the openings 5 provided in the structure 6 of the cassettes 1, therefore the trigger rail 3 is only attached to the cassettes 1 when said cassettes are inserted in the bank equipment EB, thus ensuring safe handling of the cassettes 1 in external environments.

In case the bank equipment EB is raided by spark-generating tools, said sparks (indicated by reference F) shall be driven towards "baits" 8, which are openings 9 provided in the front side 10 of the trigger rail 3, said openings 9 being established in accordance with the angled flaps 11 that help driving the sparks F towards the openings 9 and through to the spark sensor 12 which, in turn, triggers the ignition nozzles 4 that create the respective flames C, which will trigger the incineration mechanism 2 that functions on combustion and is schematically shown as dashed rectangular figures inside the cassettes 1.

Internally, the trigger rail 3 includes spark sensors 12, which are connected to each other through a fuse 13, vertically positioned inside the trigger rail 3.

Therefore, even if the sparks F only reach one of the spark sensors 12, such sensing condition shall be immediately transmitted by the fuse 13 to all other spark sensors 12, thus ensuring that all ignition nozzles 1 are simultaneously activated, regardless of the spark sensor 2 that was sensitized.

The invention claimed is:

1. A system for triggering bank equipment bill destruction devices for use in ATM and cash dispenser bank equipment (EB), devised to trigger incineration devices (2) that destroy money bills stored within cassettes (1) placed inside the bank equipment (EB), wherein the triggering system (S) features, as its main component, the trigger rail (3), a separate unit that is directly mounted to the cassette assembly (1) of the bank equipment (EB); the trigger rail (3) is fixed through the ignition nozzles (4) which are attached to the openings (5) provided in the structure (6) of the cassettes (1); the trigger rail (3) includes openings (9) provided on the front side (10) of the trigger rail (3), with said openings (9) established in accordance with the angled flaps (11) that drive the sparks (F) towards the openings (9) and, therefrom, to the spark sensor (12) which, in turn, triggers the ignition nozzles (4) that generate the respective flames (C) to trigger the incineration mechanism (2); the spark sensors (12) are connected to each other through a fuse (13), vertically positioned inside the trigger rail (3).

2. The system for triggering bank equipment bill destruction devices according to claim 1, wherein the spark sensors (12) are sensitized by the sparks (F) generated by equipment used for raiding and breaking into the bank equipment (EB), and even if only one of the spark sensors 912) is sensitized, such condition is transmitted to the other spark sensors (12) through the fuse (13), thus ensuring all ignition nozzles (4) are simultaneously triggered.

3. The system for triggering bank equipment bill destruction devices according to claim 1 or 2, wherein the ignition nozzles (4), when activated, generate flames (C) that potentially reach 900° C. and 2 cm long.

4. A methodology for triggering bank equipment bill destruction devices which includes the system (S) according to claim 1, wherein it employs pyrotechnic means to trigger the bill destruction devices (2) placed inside the cassettes (1) of bank equipment (EB).

5. The methodology for triggering bank equipment bill destruction devices according to claim 4, wherein the pyrotechnic means comprise the use of a trigger rail (3) mounted near the cassettes (1), said trigger rail (3) comprising a unit separated from the cassettes (1), which is directly mounted to the cassette assembly (1) with said trigger rail (13) remaining inaccessible inside the bank equipment (EB).

* * * * *